(No Model.) 2 Sheets—Sheet 1.

M. E. HERSHEY & B. T. ALLEN.
MOTOR GOVERNOR.

No. 603,189. Patented Apr. 26, 1898.

Witnesses:
J. M. Fowler Jr.
Aly. Stewart

Inventors
Martin E. Hershey
Benjamin T. Allen
by Church & Church
their Attorneys (No Model.) 2 Sheets—Sheet 2.
M. E. HERSHEY & B. T. ALLEN.
MOTOR GOVERNOR.
No. 603,189. Patented Apr. 26, 1898.
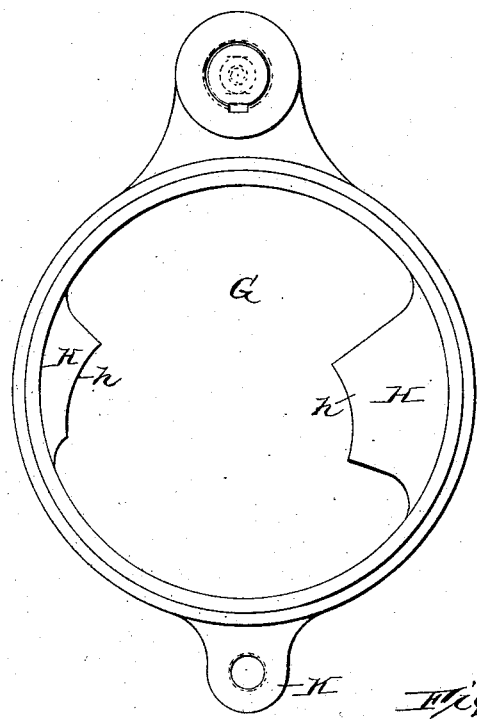
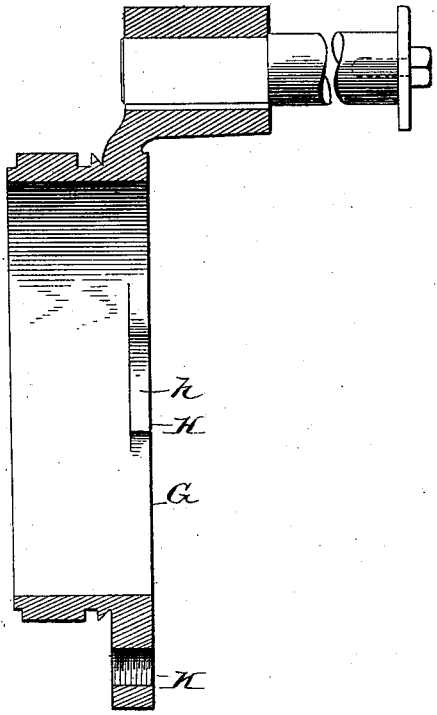
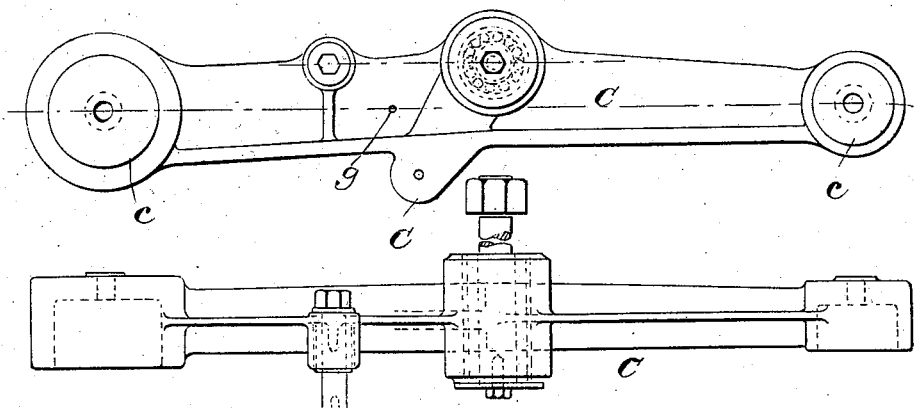
Witnesses:
J. M. Fowler Jr
Alex J. Stewart
Inventors:
Martin E. Hershey and
Benjamin T. Allen,
by Church & Church
their Attorneys.

UNITED STATES PATENT OFFICE.

MARTIN E. HERSHEY AND BENJAMIN T. ALLEN, OF HARRISBURG, PENNSYLVANIA; SAID ALLEN ASSIGNOR TO SAID HERSHEY.

MOTOR-GOVERNOR.

SPECIFICATION forming part of Letters Patent No. 603,189, dated April 26, 1898.

Application filed June 1, 1897. Serial No. 639,007. (No model.)

*To all whom it may concern:*

Be it known that we, MARTIN E. HERSHEY and BENJAMIN T. ALLEN, of Harrisburg, in the county of Dauphin and State of Pennsylvania, have invented certain new and useful Improvements in Motor-Governors; and we do hereby declare the following to be a full, clear, and exact description of the same, reference being had to the accompanying drawings, forming a part of this specification, and to the letters of reference marked thereon.

This invention relates to improvements in governors for motors, and more especially, though not exclusively, to that class of governors known as "shaft-governors" and designed with especial reference for controlling the steam, gas, or air driven motors by shifting the valves or one of the valves controlling the entrance of the motive fluid to the cylinder.

The objects of the invention are to produce a governor with the smallest possible weight of material in its construction, which material shall be evenly distributed about the axis of the shaft to give a perfect balance about the center of rotation, and at the same time to so unite or utilize the forces acting on the controlling mechanism as to secure a quick action and maintain a stable condition of speed under variations in load or in pressure of the motive fluid.

A further object of the invention is to produce a governor in which the proportions of the governing mass may be varied to adjust the speed within the range of adjustment for which the governor is designed without in any wise affecting the balance of the parts about their center of rotation.

The governor which we have selected for illustrating the present invention is of the wheel or shaft-governor type and is designed particularly for controlling the travel of the steam-valve, and referring to the accompanying drawings—

Figure 1:
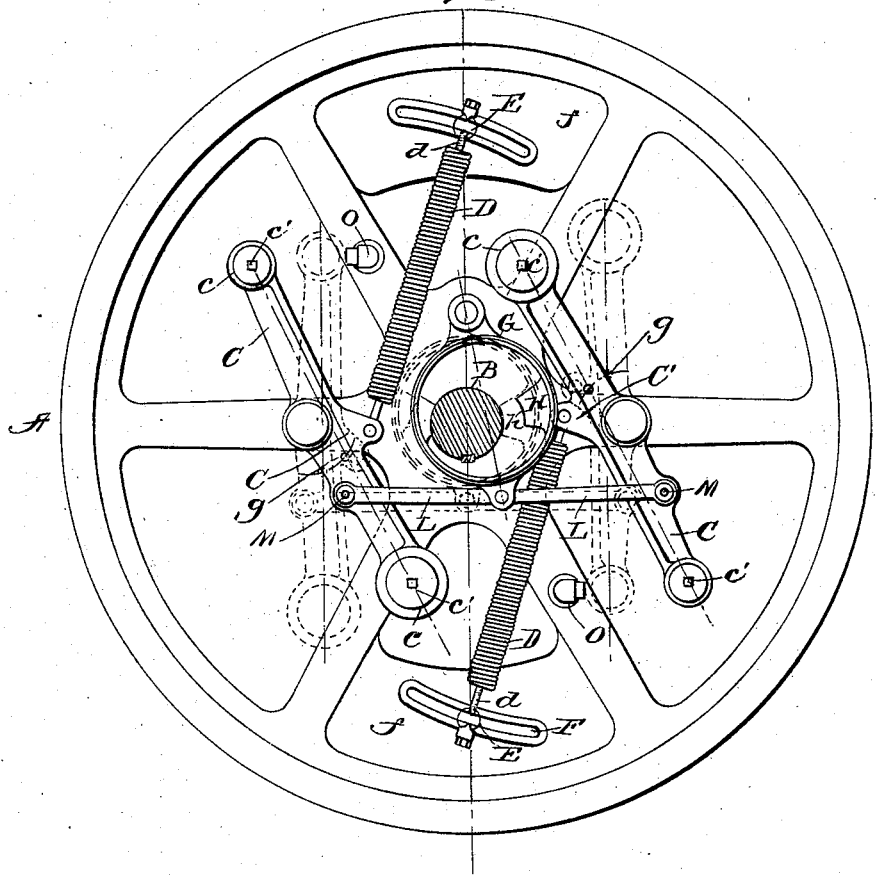
Figure 4:
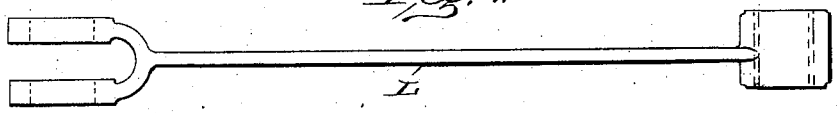
Figure 5:
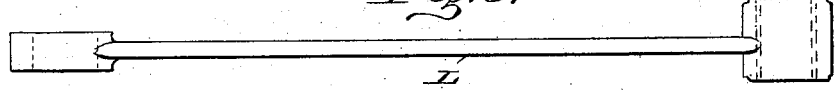

Figure 1 is a front elevation or section through an engine-shaft or counter-shaft having a wheel or carrier thereon for the governor mechanism and showing the position of the governor mechanism when at rest in full lines and when at the opposite extreme of its movement in dotted lines. Figs. 2 and 3 are enlarged detail elevations of one of the weighted levers. Figs. 4 and 5 are enlarged detail elevations of the links for connecting the weighted levers and eccentric. Figs. 6 and 7 are detail views of the eccentric.

Like letters of reference in the several figures indicate the same parts.

In said drawings the letter A indicates a belt, balance, or other wheel adapted to support the governing mechanism, said wheel being mounted on a shaft B, driven directly or indirectly by the motor, so as to rotate at a speed proportioned to the speed of the motor.

At diametrically opposite points on the governor-wheel we pivot controlling-levers C, each lever being extended on opposite sides of its pivot and having its ends weighted, each of the levers being so proportioned that the center of gravity of its mass will be located a slight distance to one side of the axis of the lever—in the illustration shown at the point $g$, which point preferably does not pass outwardly beyond the path traversed by the pivotal point of the lever in its travel around the axis of the shaft. In the preferred construction also the opposite ends of each of the levers C are provided with removable weights, which are so proportioned as to maintain the position of the center of gravity of the lever, while permitting the weight of the lever to be increased or diminished at will with a view to permitting of an adjustment of speed within the range of adjustment for which the governor is designed.

By reference to Figs. 2 and 3 it will be seen that as a matter of convenience each end of the lever is provided with a recess $c$, that at one end being somewhat larger than that at the other and adapted for the reception of removable weights, which may be held in place by bolts $c'$ or otherwise, as shown in Fig. 1. These levers are held in their normal inactive position, as when the motor is in a state of rest, by means of diametrically oppositely-located centripetally-acting springs D, such springs being preferably connected at one end to bosses $C'$ on the levers located in proximity to the points $g$, although this is optional, and at the opposite ends such springs are adjustably connected by screws d to the blocks E, and the latter are in turn adjustably mounted upon the wheel A. The blocks E are preferably adjustably mounted in slots F, formed in webs f on the wheel and struck on a radius with the point of attachment of the springs to the levers when at a position of rest as a center, thereby providing for an extremely fine adjustment of the spring with relation to the angular position of its point of attachment to the lever in its movement about the center of oscillation of the lever.

The eccentric, to which the valve-rod is directly connected by a strap or bearing, is pivoted to the wheel A a short distance to one side of the axis of the shaft, and it will be understood that while we have shown an eccentric G, Figs. 6 and 7, with its central portion cut away for the passage of the shaft B, if an outside valve is used or if the governor be located at the end of the shaft a simple pin may be substituted for the eccentric G, as is well understood in this art. The eccentric shown is provided with stop-shoulders or rests H within it, having their faces h formed on arcs, which will coincide with the periphery of the shaft when brought into contact therewith by the movement of the eccentric on its center of oscillation, as shown clearly in Fig. 1. The lower portion of the eccentric, or opposite to the pivotal point thereof, is provided with a lug K, with which the ends of two links L, Figs. 1, 4, and 5, are pivotally connected, the opposite or outer ends of these links L being pivotally connected with the governing-levers at the points M.

It will be understood that the form of bearings employed for making the pivotal connections at all the points may be of any ordinary or well-known type—ball or roller bearings, for instance—to reduce friction, or where this is not important, because of the size of the motor and governor, plain cylindrical bearings may be used.

Excessive outward throw of the governing-levers is prevented by stops O, against which said levers come to rest, thus relieving the eccentric from strain.

It will be understood that in operation the valve has its maximum travel when the parts are in their position of rest, with the governing-levers in positions shown in full lines, and that as the governing-levers swing outwardly toward the position indicated in dotted lines, due to the forces brought into play by the rotation of the wheel, the eccentric is shifted laterally with relation to the shaft and the travel of the valve is proportionately decreased, and when the speed for which the governor is set has been attained the slightest variation therefrom in either direction will cause the governing-levers to shift in the proper direction and increase or decrease the travel of the valve, so as to maintain the stable conditions desired.

Actual tests have demonstrated that the forces acting on the governing-levers when proportioned and positioned as hereinbefore described will insure an exceedingly quick action without danger of slamming or knocking either in starting or stopping or when a variation in the load or pressure of the motive fluid occurs. The forces so act on these governing-levers that the necessity for the employment of dash-pots or equivalent devices is entirely overcome, and with the accompanying disturbing influences which are necessary incidents of the employment of such devices are thereby avoided.

Having thus described our invention, what we claim as new is—

1. In an engine-governor, the combination with the rotary carrier and eccentric, of the governor-levers pivotally mounted on the carrier at diametrically opposite points, each of said levers extending on opposite sides of its pivot and having its opposite ends weighted, the mass of each of the levers and weights being so disposed that the center of gravity is at a point in alinement between the weights on opposite ends of the lever, within the path described by the pivotal center of the lever and to the forward side of a line intersecting said center and the axis of rotation of the carrier, and a connection between each of said levers and eccentric; substantially as described.

2. In a governor, the combination with the rotary carrier and eccentric, of the substantially straight governor-levers pivotally mounted on said carrier at diametrically opposite points, each of said levers extending on opposite sides of a line intersecting the axis of the carrier and lever-pivot and each having its leading end provided with a major weight and its trailing end projecting and operating outside of the path traversed by the pivotal center of the lever and provided with a minor weight, the disposition of the mass of the lever being such that the center of gravity lies within the path described by the lever-pivot and forward of a line intersecting the pivot and axis of the carrier and a connection between the lever and eccentric; substantially as described.

3. In a governor, the combination with the rotary carrier and eccentric, of a governor-lever pivotally mounted on said carrier and extended on opposite sides of its pivot, the mass of said lever being so disposed that the center of gravity is located to one side of said pivot whereby the lever is acted on by centrifugal force and independent detachable differential weights adapted to be secured to opposite ends of said lever, whereby the weight of the lever may be increased at its extremities without shifting the position of the center of gravity; substantially as described.

4. In a governor, the combination with the rotary carrier and eccentric pivotally mounted thereon, of the governor-levers pivotally mounted on said carrier at diametrically opposite points, removable weights with means for attaching said weights to opposite ends of the levers, the proportions of said weights being such that the center of gravity of the levers is not changed by their attachment, links connecting the levers and eccentric and centripetally-acting springs for holding the levers in normal position; substantially as described.

MARTIN E. HERSHEY.
BENJAMIN T. ALLEN.

Witnesses:
EUGENE SNYDER,
JOHN GASTROCK.